United States Patent Office 2,804,404
Patented Aug. 27, 1957

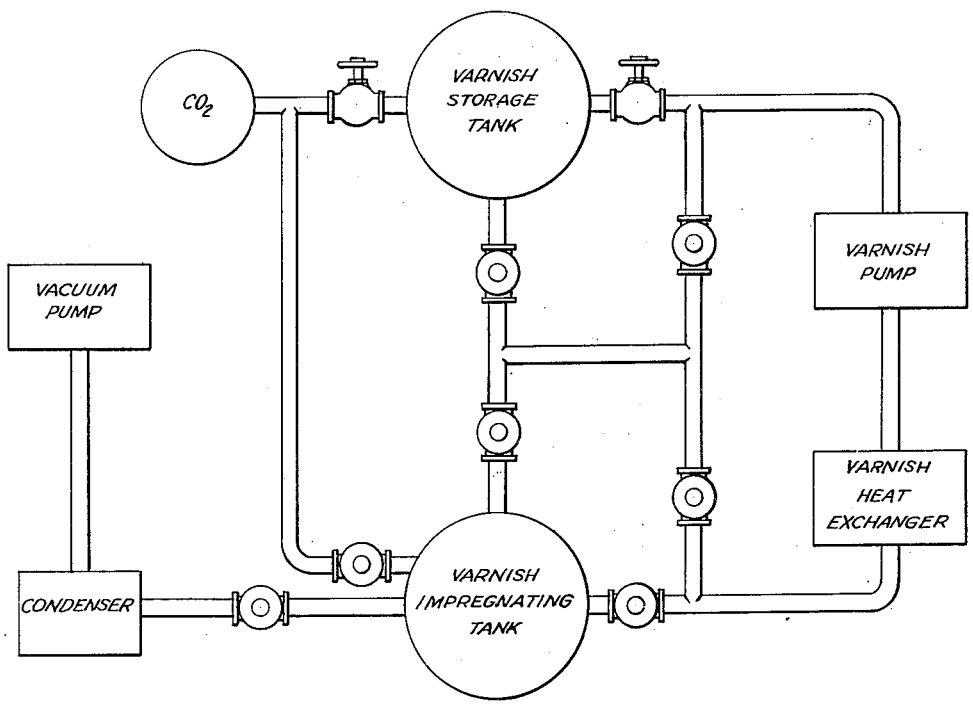

2,804,404

METHOD OF IMPREGNATING ELECTRICAL WINDINGS

Elmer E. Thiessen, La Grange, Ill., assignor to General Motors Corporation, Detroit, Mich., a corporation of Delaware Continuation of application Serial No. 203,693, December 30, 1950. This application October 4, 1955, Serial No. 538,457

6 Claims. (Cl. 117—213)

This is a continuation of United States patent application Serial No. 203,693, filed December 30, 1950, now abandoned, and relates to a method for treating electrical coils or windings and more particularly to a method for applying electrically insulating coatings to such windings.

To provide electrical windings used in motors, generators and other electrical equipment with suitable electrical insulating and thermal conducting properties, the windings are generally covered with inorganic fabric or other suitable inorganic porous materials and thereafter a varnish coating is applied. Where such materials are used, it is desirable that the interstices of the coverings and the turns of the electrical winding be thoroughly impregnated and coated with the varnish and the varnish coating be then thoroughly cured to provide optimum insulating and thermal conducting properties as well as an imperviousness to moisture and sufficient strength to resist fracture of the coating. To obtain such impregnation the common practice is to thin the varnish with a volatile solvent. After thorough impregnation of the interstices of the coverings and the interstices of the electrical winding is obtained with the thinned varnish, it is then necessary to remove the solvent so that the varnish may be adequately cured to provide the aforementioned characteristics.

Accordingly, it is an object of the present invention to provide a simple and improved method for accomplishing these ends in the manufacture of electrical windings with insulating coatings having the foregoing characteristics to an outstanding degree.

It is another object of the present invention to provide a method of applying varnish coatings to electrical windings in which heat retained in the windings from preheating is utilized in a rarefied atmosphere to volatilize the varnish solvent thus eliminating or reducing long periods of heating to cure the varnish coatings after the varnish solvent has been removed.

The method which it is desired to protect herein is specified with particularity in the appended claims and is described in the following specification and drawing in which there is schematically illustrated an apparatus suitable for use in conjunction with the new and improved method.

In accordance with my invention an exceptional combination of strength, durability and stable insulating characteristics are obtained with varnish coatings on electrical windings with pervious coverings by preheating the windings for a sufficient time at a temperature above the volatilizing temperature of the varnish solvent to obtain uniform heat distribution throughout the windings at that temperature, submerging the windings in thinned varnish to impregnate the interstices of the coverings and windings and subjecting the windings to a precuring and solvent removal treatment in a vacuum chamber.

In this manner some of the heat energy retained in the windings from preheating is transferred to the varnish as the windings come in contact with the varnish when the windings are dipped or submerged in the varnish thereby reducing the viscosity of the varnish immediately adjacent to the surface of the coil and thus obtaining deeper and faster penetration of the varnish into the interstices of the insulation and windings. Moreover, the heat retained by the windings after preheating causes the lower volatilization constituents of the solvent to be volatilized leaving the higher volatilizing constituents of the solvent in the varnish and reducing the tendency of the varnish to drain from the winding interstices before precuring the windings in a chamber under vacuum.

Immediately after the impregnation, they are subjected to pressures below atmospheric pressures which reduce the volatilization temperatures of the higher volatilization constituents of the solvent permitting the remaining heat in the windings to volatilize and remove these constituents from the varnish while simultaneously causing the varnish to set on the surfaces of the windings. The utilization of the heat retained in the coil in this manner for volatilization of the remaining solvent substantially reduces entrapment of solvent in the varnish, as, for example, in the interstices where failure of the varnish to set would affect the insulation properties of the coating.

In performing the hereinabove described sequence of operations in the method of my invention, I have found it desirable to employ apparatus such as that schematically illustrated in the drawing.

With apparatus such as that shown, varnish comprising a natural and/or synthetic thermosetting resin is thinned with a suitable solvent such as xylol or high flash naphtha to a viscosity of substantially 80 to 120 seconds through a Ford Cup No. 4 at 21.1° centigrade and is stored in the varnish storage tank at substantially room temperature. I have found that to provide such a viscosity, it is desirable to thin the varnish with a solvent such as xylol or naphtha in a ratio of about 60 percent of a synthetic thermosetting resin to about 40% solvent. As the supply of varnish becomes depleted in the storage tank it becomes necessary to add resin and solvent to replenish the supply. Further, as the sequential dipping and precuring steps cause considerable volatilization of the solvent, it is desirable to make frequent checks of the viscosity of the varnish to maintain it at a suitable viscosity either by adding solvent or resin. The varnish in the storage tank may then be transferred to the varnish impregnating tank by the varnish force pump which is connected in series with a varnish heat exchanger in a transfer line between the respective tanks. In this connection, it will, of course, be obvious that a sufficient quantity of varnish should be transferred to the impregnating tank to insure immersion of the batch of coil windings which is to be coated by dipping in the impregnating tank.

The coil windings with their porous wrappings are preheated in ovens, not shown, for a sufficient period of time to raise the winding structures to a uniform temperature substantially above the volatilization temperature of the solvent. As the heat retained by the windings during the preheating is utilized for volatilizing the lower temperature volatilizing constituents during the dipping treatment and the higher temperature volatilizing constituents during the precuring treatment at pressures below atmospheric pressure I have found that the windings should be heated in the ovens to a temperature sufficient to permit the windings to retain a temperature of substantially 100 to 120° centigrade after the dipping of the windings and immediately prior to subjecting the windings to the precuring treatment under vacuum. This temperature will also depend upon the volatilization range of the particular solvent. For xylol, which I prefer, the volatilization range is from 130° to 145° centigrade with an initial boiling point of 130° centigrade, a 50% volatilization point of 135° centigrade and a dry point of 145° centigrade. For high flash naphtha, the volatilization range is from 119° to 151° centigrade with an initial boiling point of 119° centigrade, a 50% volatilization point of 128° centigrade and a dry point of 151° centigrade.

To retain a temperature in the windings of substantially 100° to 120° centigrade after dipping and immediately prior to treatment of the coils under vacuum conditions, it is desirable to preheat the windings for about six hours at substantially 150° to 175° centigrade. The preheating time and temperature will, of course, also depend upon the size of windings, size of the electrical conductors used in the windings and the member of windings to be coated, as well as the immersion time.

With the windings uniformly heated to a temperature sufficient to retain a uniform temperature in the windings of 100° to 120° centigrade after dipping and immediately prior to precuring under vacuum, the windings are transferred to the impregnating tank where they are completely immersed in the varnish. During the immersion the lower volatilizing constituents of the solvent are boiled off by the heat of the windings and the windings and coverings retain the varnish resins. The time required for immersion in the varnish will vary depending upon the coil sizes and shapes but I have found that generally from 5 to 15 minutes effects complete impregnation of the porous coverings and electrical winding. While the windings are immersed in the impregnating tank, varnish in the impregnating tank is pumped from the tank through the varnish heat exchanger and returned to the impregnating tank. This provides for recirculation of the varnish through the impregnation tank and heat exchanger to maintain substantially uniform varnish temperature in the impregnating tank.

After impregnation of the windings the varnish is pumped from the varnish impregnating tank to the varnish storage tank and with the varnish removed from the impregnating tank the vacuum pump is started to immediately reduce the pressure in the impregnating tank to 28 inches of mercury.

As described heretofore the reduction of pressure in the impregnating tank lowers the volatilization temperature of the solvent particularly the higher volatilization constituents not previously removed by immersion of the windings in the impregnating tank and permits the heat retained by the windings to volatilize the remaining solvent and set the varnish. A condenser in series with the vacuum pump and the impregnating tank liquefies the vapor removed by the pump so that the liquid solvent may be later drained from the apparatus. To accomplish complete removal of the solvent during the low pressure treatment, I have found that it requires about 5 to 30 minutes.

After the vacuum treatment, the windings are removed from the impregnating tank and placed in ovens where they are heated at substantially 150° to 175° centigrade for about 1 to 6 hours to completely cure the varnish coating.

To avoid the hazards incident to volatile vapors of the xylol or naphtha when the windings are removed, a tank may be provided for breaking the vacuum in the impregnating tank with an inert gas. As shown, the apparatus is provided with a tank containing carbon dioxide.

In applying varnish coatings to motor field and interpole coil windings and generator interpole coil windings having metallic conductors of substantially large cross section, heating the windings to a temperature of substantially 150° centigrade for six hours with subsequent immersion of the windings for 15 minutes and a reduced pressure of 28 inches of mercury after immersion provides satisfactory varnish coatings which may be completely cured thereafter by heating to a temperature of 150° centigrade for 6 hours.

In applying varnish coatings to generator shunt field coil windings having metallic conductors of small cross section I have found that it is desirable to repeat the steps of the method. In this connection, coils of this type may be heated at a temperature of substantially 175° centigrade for 6 hours and thereafter immersed in the varnish for about 5 minutes with a subsequent vacuum treatment of 28 inches of mercury for 5 minutes. The immersion and treatment under vacuum is then repeated under the same conditions except that the vacuum is maintained for 20 minutes and the coil windings are thereafter heated for about one hour at 175° centigrade to thoroughly cure the varnish.

In applying varnish coatings in accordance with the above described method, the interstices of the insulation and winding are thoroughly filled with varnish resin with minimum loss of resin during the baking operation.

What I claim as new and desire to obtain by Letters Patent of the United States is:

1. The method of treating an electrical winding with varnish comprising the steps of immersing said winding in a bath of varnish thinned with a solvent containing a substantial portion of high boiling constituent and a substantial portion of low boiling constituent while said winding is uniformly heated to a temperature at least higher than the boiling point of said low boiling constituent, allowing said winding to remain in said bath until said winding is impregnated with said varnish and until a substantial proportion of said low boiling constituent is volatilized by the intrinsic heat energy of said winding, separating the winding from the bath, thereafter removing the remaining solvent in said impregnated winding by reducing the pressure on said winding sufficiently to allow the intrinsic heat energy remaining in said winding to volatilize the remaining low boiling constituent and substantially all of the high boiling constituent, and thereafter heating said winding to cure said varnish.

2. The method of treating an electrical winding with varnish comprising the steps of immersing said winding in a bath of varnish thinned with a solvent containing a substantial portion of high boiling constituent and a substantial portion of low boiling constituent, under atmospheric pressure while said winding is uniformly heated to a temperature at least higher than the boiling point of said low boiling constituent, allowing said winding to remain in said bath until said winding is impregnated with said varnish and until a substantial proportion of said low boiling constituent is volatilized by the intrinsic heat of said winding, separating the winding from the bath, thereafter removing the remaining solvent in said impregnated winding by subjecting said winding to a reduced pressure sufficiently low to allow the intrinsic heat of said winding to volatilize the remaining low boiling constituent and substantially all of the high boiling constituent, and thereafter heating said winding to cure said varnish.

3. In a process for treating an electrical winding with varnish by immersing said winding in a bath of varnish thinned with a solvent containing a substantial portion of high boiling constituent and a substantial portion of low boiling constituent to thereby impregnate said winding, and subsequently volatilizing the solvent in the impregnated winding, the improvement which comprises heating said winding to a uniform temperature at least above the boiling point of said low boiling constituent, immersing said heated winding in said bath until impregnaton is complete and until a substantial proportion of said low boiling constituent is volatilized, separating the winding from the bath, and thereafter subjecting the impregnated winding to a reduced pressure to thereby lower the boiling point of the high boiling constituent and allow the intrinsic heat energy of said winding to volatilize the solvent remaining in said winding.

4. The method of treating an electrical winding with varnish comprising the steps of forming a bath containing varnish thinned with a solvent containing a substantial portion of high boiling constituent and a substantial portion of low boiling constituent, heating the winding to a uniform temperature at least higher than the boiling point of said low boiling constituent, immersing said heated winding in said bath under at least atmospheric pressure until said winding is impregnated with said varnish and until at least a portion of said low boiling constituent is volatilized by the intrinsic heat energy of said winding, separating the winding from the bath, thereafter removing the remaining solvent in said imprengated winding by subjecting said winidng to a reduced pressure sufficiently low to allow the intrinsic heat energy of said winding to volatilize the remaining low boiling constituent and substantially all of the high boiling constituent, and thereafter heating said winding to cure said varnish.

5. The method of treating an electrical winding with varnish comprising the steps of immersing said winding at atmospheric pressure in a bath of varnish thinned with a solvent having a boiling range between about 119° C. and 151° C. while said winding is uniformly heated to a temperature of about 150° C. to 175° C. for about 5 to 15 minutes to impregnate said winding and volatilize a portion of said solvent, separating the winding from the bath, thereafter removing the remaining portion of said solvent in said impregnated winding by subjecting said winding to a rarefied atmosphere of about 28 inches of mercury for from 5 to 30 minutes while said winding remains at a temperature of about 100° C. to 120° C. and then heating said winding to cure said varnish.

6. The method of treating an electrical winding with varnish comprising the steps of heating said winding to a temperature of about 150° C. to 175° C. for six hours, immersing said winding in a bath of varnish thinned with solvent having a boiling range of about 130° C. to 145° C. for about 5 to 15 minutes to impregnate said winding and volatilize a portion of said solvent, separating the winding from the bath, thereafter immediately subjecting said winding to a rarefied atmosphere of about 28 inches mercury to remove the remaining portion of said solvent and then heating said winding to a temperature of about 150° C. to 175° C. from one to six hours to cure said varnish.

References Cited in the file of this patent

UNITED STATES PATENTS

| | | |
|---|---|---|
| 1,661,844 | Miller | Mar. 6, 1928 |
| 2,411,180 | Alexander | Nov. 19, 1946 |
| 2,417,538 | Alexander | Mar. 18, 1947 |
| 2,524,885 | Clokey | Oct. 10, 1950 |

OTHER REFERENCES

Electrical World, vol. 77, No. 19, pages 1055–1057.
Electrical World, vol. 78, No. 8, pages 375–377.